US011905614B2

(12) United States Patent
Miyashima et al.

(10) Patent No.: US 11,905,614 B2
(45) Date of Patent: Feb. 20, 2024

(54) TERMINAL MATERIAL FOR CONNECTOR

(71) Applicant: MITSUBISHI MATERIALS CORPORATION, Tokyo (JP)

(72) Inventors: Naoki Miyashima, Aizuwakamatsu (JP); Kazunari Maki, Aizuwakamatsu (JP); Shinichi Funaki, Aizuwakamatsu (JP); Seiichi Ishikawa, Aizuwakamatsu (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/764,261

(22) PCT Filed: Sep. 29, 2020

(86) PCT No.: PCT/JP2020/036807

§ 371 (c)(1),
(2) Date: Mar. 28, 2022

(87) PCT Pub. No.: WO2021/065866

PCT Pub. Date: Apr. 8, 2021

(65) Prior Publication Data

US 2022/0380924 A1 Dec. 1, 2022

(30) Foreign Application Priority Data

Sep. 30, 2019 (JP) ................................ 2019-181011

(51) Int. Cl.
*C25D 5/16* (2006.01)
*C25D 5/50* (2006.01)
(Continued)

(52) U.S. Cl.
CPC ................ *C25D 5/16* (2013.01); *C25D 3/12* (2013.01); *C25D 3/30* (2013.01); *C25D 3/38* (2013.01);
(Continued)

(58) Field of Classification Search
None
See application file for complete search history.

(56) References Cited

U.S. PATENT DOCUMENTS 8,981,233 B2 3/2015 Sakurai et al.
2011/0266035 A1 11/2011 Sakurai et al.
(Continued)

FOREIGN PATENT DOCUMENTS

JP 2003293187 A 10/2003
JP 2010168598 A 8/2010
(Continued)

OTHER PUBLICATIONS

Supplementary European Search Report dated Nov. 3, 2023, issued for the European Patent Application No. 20872327.0.

*Primary Examiner* — Wojciech Haske
(74) *Attorney, Agent, or Firm* — Locke Lord LLP

(57) ABSTRACT

A terminal material having a base material in which at least a surface is made of Cu or Cu alloy; an Ni layer with at thickness of 0.1 μm to 1.0 μm inclusive on the base material; a Cu—Sn intermetallic compound layer with a thickness of 0.2 μm to 2.5 μm inclusive on the Ni layer; and an Sn layer with a thickness of 0.5 μm to 3.0 μm inclusive on the Cu—Sn intermetallic compound layer, when cross sections of the Cu—Sn intermetallic compound layer and the Sn layer are analyzed by the EBSD method with a measuring step 0.1 μm and a boundary in which misorientation between adjacent pixels is 2° or more is deemed to be a crystal boundary, an average crystal grain size Dc of the Cu—Sn intermetallic compound layer is 0.5 μm or more, and a grain size ratio Ds/Dc is five or less.

8 Claims, 3 Drawing Sheets

(51) Int. Cl.

| | |
|---|---|
| ***C25D 5/12*** | (2006.01) |
| ***C25D 5/00*** | (2006.01) |
| ***C25D 3/12*** | (2006.01) |
| ***C25D 3/30*** | (2006.01) |
| ***C25D 3/38*** | (2006.01) |
| ***H01R 13/03*** | (2006.01) |

(52) U.S. Cl.
CPC ............... *C25D 5/12* (2013.01); *C25D 5/505* (2013.01); *C25D 5/617* (2020.08); *H01R 13/03* (2013.01)

(56) References Cited

U.S. PATENT DOCUMENTS

| | | | | |
|---|---|---|---|---|
| 2017/0298527 | A1 | 10/2017 | Kato et al. | |
| 2018/0044807 | A1 * | 2/2018 | Nomura .................. | C25D 5/12 |
| 2019/0362865 | A1 | 11/2019 | Inoue et al. | |

FOREIGN PATENT DOCUMENTS

| | | | |
|---|---|---|---|
| JP | 2010280946 | A | 12/2010 |
| JP | 2014122403 | A | 7/2014 |
| JP | 2016056424 | A | 4/2016 |
| WO | 2010/119489 | A1 | 10/2010 |
| WO | 2018135482 | A1 | 7/2018 |

* cited by examiner

TERMINAL MATERIAL FOR CONNECTOR

BACKGROUND OF THE INVENTION

Technical Field

The present invention relates to a terminal material for a connector used for connection of electric wiring such as an automobile, a consumer device, and the like. Priority is claimed on Japanese Patent Application No. 2019-181011, filed Sep. 30, 2019, the content of which is incorporated herein by reference.

Background Art

In general, a terminal material for a connector used for connection of electric wiring of an automobile, a consumer device or the like is manufactured by using a reflow tin plating material in which an Sn plating film formed by electrolytic plating on a surface of a base material made of Cu or Cu alloy is heated, melted, and solidified.

In such a terminal material, in recent years, it is often used in high temperature environment such as an engine room, or in environment in which the terminal itself generates heat by large current conduction. In such a high-temperature environment, it is a problem that Cu diffused outward from a base material reacts with an Sn layer to grow up to a surface as a Cu—Sn intermetallic compound, and is oxidized to increase contact resistance; so that a terminal material is required which can maintain an electric connection reliability for a long time even in a high-temperature environment.

For example, Patent Literature 1 discloses a terminal material in which an Ni layer, an intermediate layer made of a Cu—Sn alloy layer (a Cu—Sn intermetallic compound layer), and a surface layer made of Sn or Sn alloy are formed in this order on a surface of a base material made of Cu or Cu alloy. In this case, the Ni layer epitaxially grows on the base material; the average crystal grain size of the Ni layer is 1 μm or more, the thickness of the Ni layer is 0.1 to 1.0 μm, the thickness of the intermediate layer is 0.2 to 1.0 μm, and the thickness of the surface layer is 0.5 to 2.0 μm, thereby enhancing the barrier properties against the ground base material made of Cu or Cu alloy and improving heat resistance by more reliably preventing diffusion of Cu to obtain an Sn plating material which can maintain a stable contact resistance even in the high-temperature environment.

Patent Literature 2 discloses a terminal material in which a Ni or Ni alloy layer having a thickness of 0.05 to 1.0 μm is formed on a surface of a base material made of copper or copper alloy, an Sn or Sn alloy layer is formed on an outermost surface, and one or more layer of a diffusion layer in which Cu and Sn are main ingredients or a diffusion layer in which Cu, Ni and Sn are main ingredients are formed between the Ni or Ni alloy layer and the Sn or Sn alloy layer. It is also described that the thickness of the diffusion layer which is in contact with the Sn or Sn alloy layer out of these diffusion layers is 0.2 to 2.0 μm, Cu content is 50% by weight or less and Ni content is 20% by weight or less.

Patent Literature 3 discloses a terminal material having a plurality of plating layers on a surface of Cu-based base material, and an Sn—Ag coating layer having a hardness of 10 to 20 Hv and an average thickness of 0.05 to 0.5 μm is formed on an Sn-based plating layer made of an Sn or Sn alloy with an average thickness 0.05 to 1.5 μm forming the surface layer part. It is also described that the Sn—Ag coating layer includes Sn particles and $Ag_3Sn$ particles, the average crystal grain size of the Sn particles is 1 to 10 μm, and the average crystal grain size of the $Ag_3Sn$ particles is 10 to 100 nm.

CITATION LIST

Patent Literature

Patent Literature 1: Japanese Unexamined Patent Application, First Publication No. 2014-122403

Patent Literature 2: Japanese Unexamined Patent Application, First Publication No. 2003-293187

Patent Literature 3: Japanese Unexamined Patent Application, First Publication No. 2010-280946

SUMMARY OF INVENTION

Technical Problem

As described in Patent Literature 1 and Patent Literature 2, the Ni layer coating the surface of the base material restrains diffusion of Cu from the base material and the Cu—Sn intermetallic compound layer on it has an effect of restraining diffusion of Ni to the Sn layer, so that it is possible to maintain stable electric connection reliability for a long time in the high-temperature environment by this effect. However, in some cases, there is a problem in which Ni is diffused to the Sn layer in the high-temperature environment, so that a part of the Ni layer is damaged, and Cu of the base material is diffused from the damaged part into the Sn layer and reaches the surface and oxidized, resulting in an increase in the contact resistance.

By forming an Ag plating layer on the surface as described in Patent Literature 3, the oxidization on the surface can be prevented; however, there is a problem in that the cost is high.

The present invention is achieved in consideration of the above circumstances, and has an object to improve heat resistance in a terminal material in which an Ni layer, a Cu—Sn intermetallic compound layer, and an Sn layer are formed in order.

Solution to Problem

As a result of earnest studies of solution of the above problem in a terminal material in which an Ni layer, a Cu—Sn intermetallic compound layer, and an Sn layer are formed in order on a surface of a base material made of Cu or Cu alloy, the Inventor has obtained the following knowledge.

At first, the Cu—Su intermetallic compound layer functions as a barrier of Ni diffusion; accordingly, it was examined to make reflowing time longer to make the Cu—Su intermetallic compound layer thick; resulting in consuming more Sn and the Sn layer is thin; the heat resistance is deteriorated in the upshot: it is not appropriate.

In the terminal material described in Patent Literature 1, a boundary surface on the Sn layer of the Cu—Sn intermetallic compound layer between the Ni layer and the Sn layer is formed uneven. That is to say, many islets protruding toward the Sn layer are communicated, so that there are locally thick parts and thin parts in the Cu—Sn intermetallic compound layer. It has been confirmed that the Ni layer is damaged by diffusion of Ni to the Sn layer in those thin parts, and Cu in the base material is diffused to the Sn layer from the damaged parts. A factor of the formation of thin portions of the Cu—Sn intermetallic compound layer is considered because portions where the growth of the Cu—Sn intermetallic compound into the Sn layer formed thereon is likely to progress locally and portions where the Cu—Sn intermetallic compound is difficult to progress are present. Therefore, it is important to grow the Cu—Sn alloy layer flat as much as possible so as to prevent the local thin portions, so that it is effective to form diffusion paths of Cu as much as possible in the Sn layer. Under the above knowledge, the present invention has the following configuration.

A terminal material for a connector of the present invention includes a base material in which at least a surface is made of Cu or Cu alloy; a Ni layer made of Ni or Ni alloy and formed on the base material; a Cu—Sn intermetallic compound layer including Cu6Sn5 and formed on the Ni layer; and an Sn layer made of Sn or Sn alloy and formed on the Cu—Sn intermetallic compound layer. In this terminal material for a connector, a thickness of the Ni layer is 0.1 μm or more and 1.0 μm or less; a thickness of the Cu—Sn intermetallic compound layer is 0.2 μm or more, preferably 0.3 μm or more, more preferably 0.4 μm or more and 2.5 μm or less, preferably 2.0 μm or less; and a thickness of the Sn layer is 0.5 μm or more, preferably 0.8 μm or more, more preferably 1.0 μm or more and 3.0 μm or less, preferably 2.5 μm or less, more preferably 2.0 μm or less. A grain size ratio Ds/Dc is five or less where an average crystal grain size of the Cu6Sn5 in the Cu—Sn intermetallic compound layer is Dc and an average crystal grain size of the Sn layer is Ds, when cross sections of the Cu—Sn intermetallic compound layer and the Sn layer are analyzed by the EBSD method with a measuring step 0.1 μm and a boundary in which misorientation between adjacent pixels is 2° or more is deemed to be a crystal boundary.

In this terminal material for a connector, by making the average crystal grainsize Dc of Cu6Sn5 in the Cu—Sn intermetallic compound layer large as 0.5 μm or more, that is to say, by reducing the crystal grain boundary of Cu6Sn5, the thin portions in the Cu—Sn intermetallic compound layer is reduced and starting points of damaging the Ni layer are reduced.

Moreover, by making the ratio (Ds/Dc) of the average crystal grain size Ds of the Sn layer to the average crystal grain size Dc of Cu6Sn5 in the Cu—Sn intermetallic compound layer five or less, the grain boundaries of the Sn layer to the crystal of Cu6Sn5 in the Cu—Sn intermetallic compound layer are increased, so that diffusion paths of Cu into the Sn layer are increased and it is possible to grow the Cu—Sn intermetallic compound layer with a thickness nearer to be even than a conventional one.

If the thickness of the Ni layer is less than 0.1 μm, the effect of preventing the diffusion of Cu from the base material is poor; and if it exceeds 1.0 μm, cracks may occur by bending work or the like.

If the thickness of the Cu—Sn intermetallic compound layer is less than 0.2 μm, the diffusion of Ni to the Sn layer cannot possibly be suppressed sufficiently under high-temperature environment; and if it exceeds 2.5 μm, the Sn layer is made thin since it is consumed by excessive forming of the Cu—Sn intermetallic compound layer, and the heat resistance is deteriorated.

If the thickness of the Sn layer is less than 0.5 μm, the Cu—Sn intermetallic compound is easy to be exposed on the surface at high temperature, and the Cu—Sn intermetallic compound is oxidized and oxide of Cu is easy to be generated, so that the contact resistance is increased. On the other, if the thickness of the Sn layer exceeds 3.0 μm, an insertion/extraction force when using a connector is easy to be increased.

As one aspect of this terminal material for a connector, the Cu—Sn intermetallic compound layer is composed of a Cu3Sn layer formed on the Ni layer and the Cu6Sn5 layer formed on the Cu3Sn layer, and a coverage factor of the Cu3Sn layer to the Ni layer is 20% or more, preferably 25% or more, and more preferably 30% or more.

By making the Cu—Sn intermetallic compound layer a double structure of the Cu3Sn layer and the Cu6Sn5 layer and covering the Ni layer by the Cu3Sn layer configuring the under layer, soundness of the Ni layer is maintained and the diffusion of Cu in the base material is prevented, so that the increase or the like of the contact resistance can be suppressed. The larger the coverage factor of the Cu3Sn layer is, the larger the crystal grain size of the Cu6Sn5 layer is, and for that, the less the number of the crystal grain boundaries to be the diffusion paths of Ni are, so it is possible to restrain the damage of the Ni layer when it is high temperature. The coverage factor of the Cu3Sn layer is preferably 20% or more.

As another aspect of the terminal material for a connector, in the Sn layer, when a grain boundary length of a crystal in which the misorientation is 15° or more is La and a grain boundary length of a crystal in which the misorientation is 2° or more and less than 15° is Lb among the crystal boundary demarcated by the EBSD method, an Lb ratio (Lb/(Lb+La)) is 0.1 or more.

The Lb ratio (Lb/(Lb+La)) is a length ratio occupied by the crystal grain boundary in which the misorientation is small. By making this ratio large, minute Sn crystals are increased. That is, since the grain boundaries of Sn to be the diffusion paths of Cu into the Sn layer are increased, the thickness of the Cu—Sn intermetallic compound layer becomes almost even.

If the Lb ratio is less than 0.1, Sn having a large crystal grain size is relatively increased. That is, since the grain boundaries of Sn to be the diffusion paths of Cu into the Sn layer are decreased, the Cu—Sn intermetallic compound layer has much uneven and easily has locally thin portions.

A manufacturing method of a terminal material for a connector of the present invention has a plating treatment step performing an Ni plating treatment forming a plating layer made of Ni or Ni alloy on a surface of a base material in which at least a surface is made of Cu or Cu alloy, a Cu plating treatment forming a plating layer made of Cu or Cu alloy, and an Sn plating treatment forming a plating layer made of Sn or Sn alloy in this order, and a reflowing treatment step performing a reflow treatment after the plating treatment step. By these steps, a terminal material for a connector in which an Ni layer made of Ni or Ni alloy is formed on the base material, a Cu—Sn intermetallic compound layer made of intermetallic compound (IMC: Intermetallic Compound) of Cu and Sn is formed on the Ni layer, and an Sn layer made of Sn or Sn alloy is formed on the Cu—Sn intermetallic compound layer is manufactured. In this manufacturing method, the reflowing treatment has a heating step performing a primary heating treatment heating to 240° C. or more at a raising temperature rate of 20° C./second or more and 75° C./second or less and a secondary heating treatment heating after the primary heating treatment at temperature of 240° C. or more and 300° C. or less for time of one second or more and 15 seconds or less; a primary cooling step cooling after the heating step at a cooling rate of 30° C./second or less; and a secondary cooling step after the primary cooling at a cooling rate of 100° C./second or more and 300° C./second or less.

In this manufacturing method, in the reflowing treatment, Cu and Sn react sufficiently by controlling the time from the secondary heating treatment to the primary cooling step, so that the grain size of the Cu—Sn intermetallic compound is largely grown. Then, after the primary cooling step, the grain size of the Sn layer is finely controlled by the secondary cooling step from the vicinity of the melting point (about 232° C.) of Sn. The grain size of the Sn layer can be controlled by starting temperature and the cooling rate of the secondary cooling step.

Moreover, structure of the Sn layer can be solidification structure by performing such a heating treatment. By making the Sn layer the solidification structure, it is possible to release the inner stress of the Sn layer and to prevent whiskers from occurring.

Advantageous Effects of Invention

According to the present invention, it is possible to improve the heat resistance in the terminal material configured by forming the Ni layer, the Cu—Sn intermetallic compound layer, and the Sn layer in order.

DESCRIPTION OF EMBODIMENTS

Below, an embodiment of a terminal material for a connector of the present invention will be explained in detail.

Figure 1:
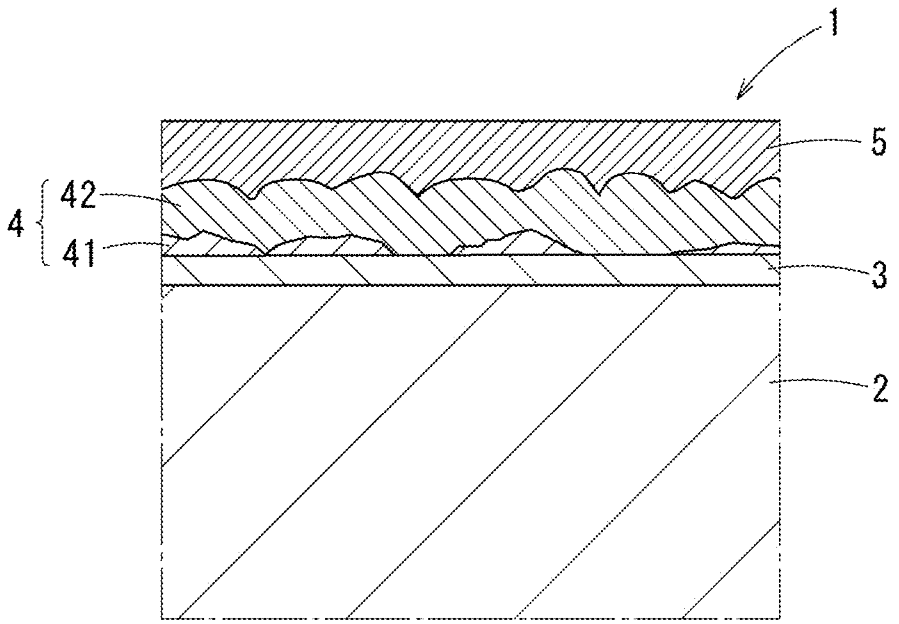
FIG. 1 It is a cross sectional view schematically showing one embodiment of a terminal material for a connector according to the present invention.

As shown in FIG. 1, in a terminal material 1 for a connector of one embodiment, an Ni layer 3 made of Ni or Ni alloy is formed on a base material 2 in which at least a surface is made of Cu or Cu alloy; a Cu—Sn intermetallic compound layer 4 made of intermetallic compound of Cu and Sn is formed on the Ni layer 3; and an Sn layer 5 made of Sn or Sn alloy is formed on the Cu—Sn alloy intermetallic compound layer 4.

The base material 2 is wire material made in a belt-sheet shape, and is not limited in the composition if a surface is made of Cu or Cu alloy.

The nickel layer 3 is made by electrolytic plating of Ni or Ni alloy on a surface of the base material 2, and formed in a thickness of 0.1 μm or more and 1.0 μm or less. If the thickness of the Ni layer 3 is less than 0.1 μm, an effect of preventing diffusion of Cu from the base material 2 is poor; and if it exceeds 1.0 μm, cracks may occur by bending work or the like.

The Cu—Sn intermetallic compound layer 4 is, as described below, formed by performing a Cu plating treatment forming a plating layer made of Cu or Cu alloy and a Sn plating treatment forming a plating layer made of Sn or Sn alloy on the Ni layer 3 in this order and then reflowing treatment, so that Cu and Sn react. The Cu—Sn intermetallic compound layer 4 has a double structure of a $Cu_3Sn$ layer 41 formed on the Ni layer 3 and a $Cu_6Sn_5$ layer 42 arranged on the $Cu_3Sn$ layer, and is formed in a thickness of 0.2 μm or more and 2.5 μm or less. A coverage factor of the $Cu_3Sn$ layer on the Ni layer 3 is 20% or more.

If the thickness of the Cu—Sn intermetallic compound layer 4 is less than 0.2 μm, function as a barrier wall of Cu is lost, and the contact resistance may be increased in high-temperature environment. If the thickness exceeds 2.5 μm, the Sn layer 5 is much consumed for that and the Sn layer 5 gets thin, and it brings the deterioration of the heat resistance. The thickness of the Cu—Sn intermetallic compound layer is preferably 0.3 μm or more; more preferably, 0.4 μm or more; and preferably 2.0 μm or less.

By coating the Ni layer 3 with the $Cu_3Sn$ layer 41, soundness of the Ni layer 3 is maintained, Cu in the base material 2 is prevented from diffusion, and it is possible to restrain the increase and the like of the contact resistance. The larger the coverage factor of the $Cu_3Sn$ layer 41 is, the larger crystal grain size of the $Cu_6Sn_5$ layer 42 is, and the more crystal grains of $Cu_6Sn_5$ layer are in contact with crystal grain boundaries of the Sn layer 5 for that, so that diffusion paths of Cu are increased and the Cu—Sn intermetallic compound layer 4 can be uniformly is uniformly grown. It is preferably that the coverage factor of the $Cu_3Sn$ layer 41 be 20% or more. The coverage factor of the $Cu_3Sn$ layer 41 is preferably 25% or more; more preferably, 30% or more.

The $Cu_3Sn$ layer 41 does not necessarily cover whole surface of the Ni layer 3, so that there is a case in which there is a portion where the $Cu_3Sn$ layer 41 is not formed on the Ni layer 3: in this case, the $Cu_6Sn_5$ layer 42 is directly in contact with the Ni layer 3.

Performing a section processing on a film portion of the terminal material by focused ion beam (FIB) and observing the cross section of the film by a scanning electron microscope (SEM), the coverage factor is obtained by a ratio of a boundary surface length of the Cu3Sn layer in contact with the Ni layer 3 to a boundary surface length between the Ni layer 3 and the Cu—Sn intermetallic compound layer 4.

The Sn layer 5 is formed by carrying out a Cu plating treatment and an Sn plating treatment on the Ni layer 3 then reflowing treatment. The thickness of the Sn layer 5 is 0.5 μm or more and 3.0 μm or less. If the thickness of the Sn layer 5 is less than 0.5 Cu—Sn intermetallic compound is easily exposed on a surface when it is high temperature, and Cu oxide of Cu is easily generated on the surface since the Cu—Sn intermetallic compound is oxidized, so that the contact resistance is increased. On the other hand, if the thickness of the Sn layer 5 exceeds 3.0 μm, the insertion/extraction force at the time of using the connector is easily increased. The thickness of the Sn layer 5 is preferably 0.8 μm or more, more preferably 1.0 μm or more; and preferably 2.5 μm or less, more preferably 2.0 μm or less.

Cross sections of the Cu—Sn intermetallic compound layer 4 and the Sn layer 5 are analyzed by the EBSD method with a measuring step of 0.1 μm; considering a boundary in which misorientation between adjacent pixels is 2° or more as a crystal boundary, taking Dc for an average crystal grain size of the Cu—Sn intermetallic compound layer 4, and taking Ds for an average crystal grain size of the Sn layer; an average crystal grain size Dc is 0.5 μm or more and a grain size ratio Ds/Dc is 5 or less.

Making the average crystal grain size Dc of the Cu—Sn intermetallic compound layer 4 large as 0.5 μm or more, the unevenness of the Cu—Sn intermetallic compound layer 4 becomes small, and the occurrence of the portions where locally being too thin can be decreased. Moreover, making the ratio (Ds/Dc) of the average crystal grain size Ds of the Sn layer 5 to the average crystal grain size Dc of the Cu—Sn intermetallic compound layer 4 five or less, the grain boundaries of the Sn layer 5 to the crystal of the Cu—Sn intermetallic compound 4 are increased, the diffusion paths of Cu into the Sn layer 5, and the Cu—Sn intermetallic compound layer 4 can be grown with an even thickness. The average crystal grain size Dc is preferably 0.6 μm or more; the grain size ratio Ds/Dc is preferably four or less, more preferably three or less.

In the Sn layer 5, when the grain boundary length of a crystal in which the misorientation is 15° or more is La and the grain boundary length of a crystal in which the misorientation is 2° or more and less than 15° is Lb among the crystal boundary demarcated by the above-described EBSD method, an Lb ratio (Lb/(Lb+La)) is 0.1 or more.

The Lb ratio (Lb/(Lb+La)) is a ratio for which a length of grain boundaries account where the misorientation is small; by making the LB ratio large, minute Sn crystals increase. That is, since the grain boundaries of Sn to be the diffusion paths of Cu into the Sn layer 5 is increased, the thickness of the Cu—Sn intermetallic compound layer 4 becomes more even.

It has been found that Sn having relatively large crystal grain size was increased when the Lb ratio is less than 0.1. That is, since the grain boundaries of Sn to be the diffusion paths of Cu into the Sn layer 5 is decreased, the Cu—Sn intermetallic compound layer 4 easily becomes a state in which many unevenness and locally thin portions. The Lb ratio is preferably 0.2 or more, more preferably 0.3 or more.

The terminal material 1 for a connector configured as above is formed by performing Ni plating treatment forming a plating layer made of Ni or Ni alloy, Cu plating treatment forming a plating layer made of Cu or Cu alloy, and Sn plating treatment forming a plating layer made of Sn or Sn alloy on the base material 2 in order, then reflowing.

General Ni plating baths can be used for Ni plating treatment; for example, Watt bath in which nickel sulfate ($NiSO_4$) and nickel chloride ($NiCl_2$), boric acid ($H_3BL_3$) are main ingredients and the like can be used. Temperature of the plating bath is 20° C. or more and 60° C. or less, and current density is 5 to 60 A/$dm^2$. A film thickness of the Ni plating layer made by this Ni plating treatment is 0.1 μm or more and 1.0 μm or less.

General Cu plating baths can be used for the Cu plating treatment; for example, a copper sulfate bath in which copper sulfate ($CuSO_4$) and sulfuric acid ($H_2SO_4$) are main ingredients can be used. Temperature of the plating bath is 20 to 50° C., and current density is 1 to 50 A/$dm^2$. A film thickness of the Cu plating layer made by this Cu plating treatment is 0.05 μm or more and 10 μm or less.

General Sn plating baths may be used for the Sn plating treatment, for example, a sulfuric acid bath in which sulfuric acid ($H_2SO_4$) and stannous sulfate (SnSO4) are main ingredients can be used. Temperature of the plating bath is 15 to 35° C., current density is 1 to 30 A/$dm^2$. A film thickness of the Cu plating layer made by this Sn plating treatment is 0.1 μm or more and 5.0 μm or less.

For the reflow treatment, the Cu plating layer and the Sn plating layer are heated to be melted once and the rapid cooled. For example, after primary heating treatment in which a treated material after subjected to the Cu plating treatment and the Sn plating treatment is heated in a heating furnace of CO reducing atmosphere with a raising temperature rate of 20° C./second or more and 75° C./second or less to 240° C. or more, a heating step heating at temperature of 240° C. or more and 300° C. or less for one second or more and 15 seconds or less, a primary cooling step cooling at a cooling rate of 30° C./second or less after the heating step, and a secondary cooling step cooling at a cooling rate of 100° C./second or more and 300° C./second or less after the primary cooling step are performed.

Regarding the temperature setting of the secondary heating treatment, for example, it is good to maintain at the temperature reached in the primary heating treatment, or it is also good to raise gradually to a target temperature in the secondary heating treatment after heating to a temperature lower than the target temperature while the primary heating treatment, or it is also good to appropriately change in the above-mentioned temperature range.

Figure 2:
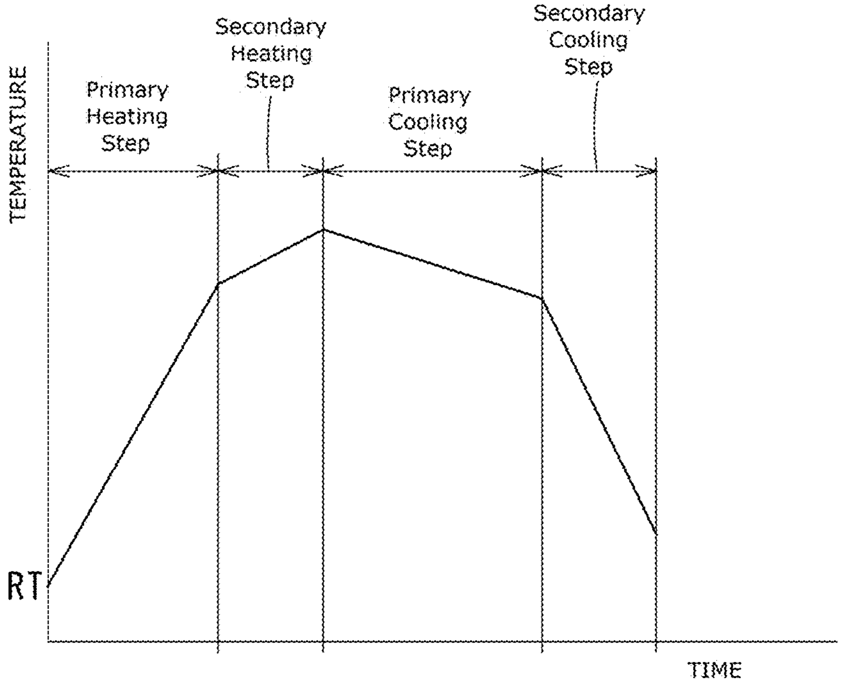
FIG. 2 It is a temperature profile graphing a relation between temperature and time of reflowing condition in manufacturing the terminal material for a connector in FIG. 1.

One example of a relation between the temperature and time in the reflowing treatment is shown in FIG. 2. By this reflowing treatment, the terminal material 1 for a connector in which the Cu—Sn intermetallic compound layer 4 and the Sn layer 5 are formed in order on the Ni layer 3 is obtained as shown in FIG. 1. The Cu—Sn intermetallic compound layer 4 is made of chiefly the $Cu_3Sn$ layer 41 and the $Cu_6Sn_5$ layer 42. There is a case in which a part of the Cu plating layer remains between the Ni layer 3 and the Cu—Sn intermetallic compound layer 4.

In view of making the particle size of $Cu_6Sn_5$ large in the Cu—Sn intermetallic compound, a process is preferable to gradually cool nearly to the melting point of Sn in the primary cooling step and then to rapidly cool in the subsequent secondary cooling step.

In this reflowing treatment, by heating Sn above the melting point and regulating conditions of the first heating and the second heating, Cu and Sn are sufficiently reacted to grow the particle size of the Cu—Sn intermetallic compound large. Then, after the primary cooling step to gradually cool, the particle size of the Sn layer 5 is controlled by the secondary cooling step from near the melting point of Sn. The particle size of the Sn layer 5 can be controlled by the starting temperature and the cooling rate in the secondary cooling step. By performing the heating treatment as above, the Sn layer 5 can be a solidification structure.

The terminal material 1 for a connector is formed into a male terminal or a female terminal by press die-punching into a prescribed external form and performing machine processing such as a bending work and the like.

In this terminal, less portions are locally thin in the Cu—Sn intermetallic compound layer 4, the Cu—Sn intermetallic compound layer 4 is grown with a thickness nearer to be even, and damages of the Ni layer 3 is restricted even in the high-temperature environment, so that low contact resistance can be maintained and excellent heat resistance can be shown.

In the above embodiment, the Ni plating layer, the Cu plating layer, and the Sn plating layer are layered on the base material by the electrolytic plating; however, it is not limited and possible to form films by non-electrolytic plating, or general film formation methods such as PVD, CVD and so on.

EXAMPLES

Ni plating treatment, Cu plating treatment, and Sn plating treatment were carried out in order by electrolytic plating on a base material which was an H temper material of copper alloy (Mg: 0.7% by mass-P: 0.005% by mass) of a plate thickness of 0.2 mm. Plating conditions in Examples and Comparative Examples were the same, as shown below, and film thicknesses were controlled by adjusting plating time. Dk denotes current density of a cathodes, and ASD is an abbreviation of A/$dm^2$.

<Nickel Plating Treatment>

| Composition of Plating Solution | |
|---|---|
| Nickel sulfate | 280 g/L |
| Nickel chloride | 30 g/L |
| Boric acid | 45 g/L |
| Temperature of Plating solution | 45° C. |
| Current density of Cathode (Dk) | 5 ASD (A/$dm^2$) |

<Copper Plating Treatment>

| Composition of Plating Solution | |
|---|---|
| Copper sulfate | 80 g/L |
| Sulfuric acid | 200 g/L |
| Additive | Proper amount |
| Temperature of Plating solution | 25° C. |
| Current density of Cathode (Dk) | 3 ASD (A/$dm^2$) |

<Tin Plating Treatment>

| Composition of Plating Solution | |
|---|---|
| Tin sulfate | 50 g/L |
| Sulfuric acid | 100 g/L |
| Additive | Proper amount |
| Temperature of plating solution | 25° C. |
| Current density of cathode (Dk) | 2 ASD (A/$dm^2$) |

After performing the tin plating treatment that is the last step of the plating treatment, the reflowing treatment was performed one minute later. A heating step (the primary heating treatment and the secondary), the primary cooling step, and the secondary cooling step were performed in this reflowing treatment. The thicknesses of the plating layers (the thicknesses of the Ni plating layer, the Cu plating layer, and the Sn plating layer), and reflowing condition (the temperature raising rate and attainment temperature of the primary heating, temperature raising rate and peak temperature of the secondary heating, maintaining time at the peak temperature (peak temperature maintaining time), the primary cooling rate, and the secondary cooling rate) were as shown in Tables 1 to 3.

TABLE 1

| Thickness of Plating Layer (μm) | | | Reflowing Condition | | | | | | |
|---|---|---|---|---|---|---|---|---|---|
| | | | Heating Step | | | | | Primary Cooling Step | Secondary Cooling Step |
| | | | Primary Heating | | Secondary Heating | | Peak | | |
| | | | Raising Temp. Rate | Atteining Temp. | Raising Temp. Rate | Peak Temp. | Temp. Holding Time | Cooling Rate | Cooling Rate |
| Ni | Cu | Sn | (° C./s) | (° C.) | (° C./s) | (° C.) | (s) | (° C./s) | (° C./s) |
| ~0.3 | 0.05~10 | 0.5~1.2 | 60 | 250 | 15 | 280 | 5 | 3-30 | 100-300 |
| | | | | | | | | 30-50 | 50-100 |
| | | 1.2~4.0 | 70 | 270 | 20 | 300 | 5 | 3-30 | 130-300 |
| | | | | | | | | 30-50 | 50-130 |

TABLE 2

| Thickness of Plating Layer (μm) | | | Reflowing Condition | | | | | | |
|---|---|---|---|---|---|---|---|---|---|
| | | | Heating Step | | | | | Primary Cooling Step | Secondary Cooling Step |
| | | | Primary Heating | | Secondary Heating | | Peak | | |
| | | | Raising Temp. Rate | Atteining Temp. | Raising Temp. Rate | Peak Temp. | Temp. Holding Time | Cooling Rate | Cooling Rate |
| Ni | Cu | Sn | (° C./s) | (° C.) | (° C./s) | (° C.) | (s) | (° C./s) | (° C./s) |
| 0.3~0.7 | 0.05~10 | 0.5~1.2 | 60 | 250 | 15 | 280 | 5 | 2-30 | 100-300 |
| | | | | | | | | 30-50 | 50-100 |
| | | 1.2~4.0 | 70 | 270 | 20 | 300 | 5 | 2-30 | 130-300 |
| | | | | | | | | 30-50 | 50-130 |

TABLE 3

| Thickness of Plating Layer (μm) | | | Reflowing Condition: Heating Step: Primary Heating: Raising Temp. Rate | Atteining Temp. | Secondary Heating: Raising Temp. Rate | Peak Temp. | Peak Temp. Holding Time | Primary Cooling Step Cooling Rate | Secondary Cooling Step Cooling Rate |
|---|---|---|---|---|---|---|---|---|---|
| Ni | Cu | Sn | (° C./s) | (° C.) | (° C./s) | (° C.) | (s) | (° C./s) | (° C./s) |
| 0.7~ | 0.05~10 | 0.5~1.2 | 60 | 250 | 15 | 280 | 5 | 1-30 | 100-300 |
| | | | | | | | | 30-50 | 50-100 |
| | | 1.2~4.0 | 70 | 270 | 20 | 300 | 5 | 1-30 | 130-300 |
| | | | | | | | | 30-50 | 50-130 |

Regarding Samples obtained by the different conditions described above, thicknesses of the Ni layer, the Cu—Sn intermetallic compound layer, the Sn layer were measured, and the average crystal grain size Dc of Cu6Sn5 in the Cu—Sn intermetallic compound layer, the average crystal grain size Ds od the Sn layer, and the coverage factor of the Cu3 Sn layer on the boundary surface to the Ni layer were measured, and the grain size ratio (Ds/Dc) between the average crystal grain size Dc of Cu6Sn5 and the average crystal grain size Ds of the Sn layer was obtained. The Lb ratio (Lb/(Lb+La)) was obtained; where the grain boundary length of crystal in which the misorientation is 15° or more in the Sn layer was La and the grain boundary length of crystal in which the misorientation is 2° or more and less than 15° was Lb.

(Thicknesses of Layers)

The respective thicknesses of the Ni layer, the Cu—Sn intermetallic compound layer, and the Sn layer were measured by X-ray fluorescent thickness meter (SEA5120A made by SII Nanotechnology Inc.)

(Calculation of Average Crystal Grain Size and Grain Size Ratio Ds/Dc)

Measurement surfaces for the average crystal grain size Dc of Cu6Sn5 and the average crystal grain size Ds of the Sn layer were a perpendicular surface to a rolling direction, i.e., an RD (rolling direction) surface. The measurement surfaces were subjected to a cross section processing by focused ion beam (FIB), and analyzed by an EBSD device (a crystal orientation analysis apparatus OIM made by TSL) and analyzation software (OIM Analysis ver. 7.1.0 made by TSL) with 15 kV of acceleration voltage of electron beam at 0.1 μm of a measurement step on a measurement area of 1000 $\mu m^2$ or more. In consequence of analysis, the boundaries in which the misorientation between the adjacent pixels was 2° or more were considered as the crystal boundaries to make a crystal grain boundary map.

In the crystal grain boundary map, the average crystal grain size Dc and Ds were obtained from line segments drawn to be parallel to the base material crossing the measurement surface. Specifically, drawing a line segment so that the number of crystal grains on the line segment was maximum, and the length of this line segment was divided by the number of the crystal grains on the line segment to obtain the average crystal grain size. A plurality of line segments were drawn until the total length of the line segments was 100 μm or more, and it was measured.

(Coverage Ratio of Cu3Sn Layer)

The coverage ratio of the Cu3Sn layer was obtained from a ratio of a boundary surface length between the Cu3Sn layer and the Ni layer to a boundary surface length between the Cu—Sn intermetallic compound layer (the Cu3Sn layer and the Cu6Sn5 layer) and the Ni layer from a scanned ion image (a SEM image) of a surface by performing a cross section processing on a film part of a terminal material by focused ion beam (FIB) and observing a cross section of the film by a scanning electron microscope (SEM).

(Ratio of Lb (Lb/(Lb+La)))

The Lb ratio (Lb/(Lb+La)) was obtained where the grain boundary length of crystal in which the misorientation was 15° or more was La and the grain boundary length of crystal in which the misorientation was 2° or more and less than 15° was Lb from the crystal grain boundary map measured by the above-described EBSD method in the Sn layer.

Tables 4 to 8 show the average crystal grain sizes Dc, Ds/Dc, the thickness of the Cu—Sn intermetallic compound layer (denoted as Cu—Sn IMC), the Sn layer thickness, the Ni layer thickness, the coverage factor of Cu3Sn, and the Lb ratio of Samples (A1 to A52 and B1 to B8).

TABLE 4

| No. | Dc [μm] | Ds/Dc | Thickness: Cu—Sn IMC [μm] | Thickness: Sn Layer [μm] | Thickness: Ni Layer [μm] | $Cu_3Sn$ Coverage Factor [%] | Lb Ratio |
|---|---|---|---|---|---|---|---|
| A1 | 0.50 | 1.0 | 0.20 | 0.54 | 0.10 | 27 | 0.8 |
| A2 | 0.51 | 1.0 | 0.22 | 0.51 | 0.34 | 29 | 0.8 |
| A3 | 0.52 | 1.9 | 0.22 | 0.52 | 0.32 | 24 | 0.8 |
| A4 | 0.51 | 2.0 | 0.21 | 0.54 | 0.92 | 26 | 0.8 |
| A5 | 0.50 | 3.0 | 0.22 | 0.58 | 0.95 | 28 | 0.8 |
| A6 | 0.99 | 0.5 | 0.22 | 0.55 | 0.12 | 43 | 0.6 |
| A7 | 1.03 | 0.5 | 0.21 | 0.55 | 0.28 | 41 | 0.6 |
| A8 | 1.02 | 1.0 | 0.22 | 0.53 | 0.31 | 41 | 0.6 |
| A9 | 0.94 | 2.7 | 0.21 | 0.56 | 0.31 | 40 | 0.6 |
| A10 | 2.05 | 0.2 | 0.22 | 0.55 | 0.27 | 57 | 0.5 |
| A11 | 2.08 | 0.5 | 0.21 | 0.58 | 0.35 | 57 | 0.5 |
| A12 | 1.88 | 1.1 | 0.21 | 0.54 | 0.25 | 56 | 0.5 |
| A13 | 5.14 | 0.1 | 1.03 | 0.57 | 0.11 | 81 | 0.3 |

TABLE 5

| | | | Thickness | | | $Cu_3Sn$ | |
|---|---|---|---|---|---|---|---|
| No. | Dc [μm] | Ds/Dc | Cu—Sn IMC [μm] | Sn Layer [μm] | Ni Layer [μm] | Coverage Factor [%] | Lb Ratio |
| A14 | 5.28 | 0.1 | 0.77 | 0.51 | 0.27 | 72 | 0.1 |
| A15 | 5.06 | 0.1 | 0.88 | 0.52 | 0.29 | 77 | 0.3 |
| A16 | 4.91 | 0.4 | 1.51 | 0.52 | 0.33 | 79 | 0.3 |
| A17 | 1.90 | 1.1 | 2.49 | 0.54 | 0.35 | 84 | 0.5 |
| A18 | 0.52 | 2.9 | 0.22 | 0.53 | 0.31 | 18 | 0.8 |
| A19 | 0.92 | 2.7 | 0.22 | 0.53 | 0.31 | 40 | 0.6 |
| A20 | 0.51 | 4.1 | 0.24 | 0.57 | 0.92 | 27 | 0.8 |
| A21 | 0.50 | 1.0 | 0.20 | 1.08 | 0.10 | 24 | 0.8 |
| A22 | 0.52 | 1.0 | 0.21 | 1.00 | 0.25 | 27 | 0.8 |
| A23 | 0.51 | 2.0 | 0.21 | 1.10 | 0.32 | 22 | 0.8 |
| A24 | 0.53 | 1.9 | 0.22 | 1.07 | 0.99 | 27 | 0.8 |
| A25 | 0.52 | 2.9 | 0.22 | 0.96 | 0.91 | 24 | 0.8 |
| A26 | 1.04 | 0.5 | 0.22 | 1.09 | 0.11 | 36 | 0.6 |

TABLE 6

| | | | Thickness | | | $Cu_3Sn$ | |
|---|---|---|---|---|---|---|---|
| No. | Dc [μm] | Ds/Dc | Cu—Sn IMC [μm] | Sn Layer [μm] | Ni Layer [μm] | Coverage Factor [%] | Lb Ratio |
| A27 | 0.98 | 1.0 | 0.20 | 0.98 | 0.28 | 37 | 0.6 |
| A28 | 1.03 | 2.9 | 0.22 | 0.97 | 0.27 | 36 | 0.6 |
| A29 | 1.95 | 0.3 | 0.21 | 1.06 | 0.33 | 57 | 0.5 |
| A30 | 2.05 | 1.0 | 0.20 | 1.09 | 0.26 | 59 | 0.5 |
| A31 | 4.84 | 0.1 | 1.14 | 1.05 | 0.12 | 76 | 0.3 |
| A32 | 4.93 | 0.1 | 0.92 | 0.97 | 0.31 | 76 | 0.2 |
| A33 | 4.88 | 0.1 | 0.99 | 0.95 | 0.33 | 79 | 0.3 |
| A34 | 2.05 | 1.0 | 2.49 | 1.05 | 0.31 | 80 | 0.5 |
| A35 | 0.53 | 2.8 | 0.21 | 0.98 | 0.30 | 17 | 0.8 |
| A36 | 0.60 | 3.0 | 0.23 | 0.91 | 0.28 | 39 | 0.6 |
| A37 | 0.53 | 4.9 | 0.24 | 1.11 | 0.99 | 28 | 0.8 |
| A38 | 0.50 | 1.0 | 0.22 | 2.85 | 0.12 | 20 | 0.8 |
| A39 | 0.50 | 1.0 | 0.21 | 2.96 | 0.10 | 23 | 0.8 |

TABLE 7

| | | | Thickness | | | $Cu_3Sn$ | |
|---|---|---|---|---|---|---|---|
| No. | Dc [μm] | Ds/Dc | Cu—Sn IMC [μm] | Sn Layer [μm] | Ni Layer [μm] | Coverage Factor [%] | Lb Ratio |
| A40 | 0.53 | 0.9 | 0.20 | 2.94 | 0.10 | 23 | 0.8 |
| A41 | 0.51 | 2.0 | 0.21 | 2.94 | 0.31 | 21 | 0.8 |
| A42 | 0.51 | 2.9 | 0.20 | 2.93 | 0.11 | 21 | 0.8 |
| A43 | 0.53 | 2.8 | 0.20 | 2.92 | 1.00 | 29 | 0.8 |
| A44 | 0.97 | 1.0 | 0.22 | 2.97 | 0.30 | 39 | 0.6 |
| A45 | 1.09 | 1.8 | 0.21 | 2.98 | 0.31 | 37 | 0.6 |
| A46 | 1.93 | 0.3 | 0.21 | 2.97 | 0.31 | 56 | 0.5 |
| A47 | 1.95 | 0.5 | 0.22 | 3.00 | 0.32 | 58 | 0.5 |
| A48 | 2.04 | 1.0 | 0.22 | 2.93 | 0.27 | 63 | 0.5 |
| A49 | 5.17 | 0.1 | 1.35 | 2.97 | 0.11 | 78 | 0.3 |
| A50 | 2.06 | 1.0 | 2.50 | 2.94 | 0.32 | 83 | 0.5 |
| A51 | 0.51 | 2.9 | 0.21 | 2.94 | 0.98 | 16 | 0.8 |
| A52 | 1.02 | 2.9 | 0.23 | 2.89 | 0.97 | 31 | 0.6 |

TABLE 8

| | | | Thickness | | | $Cu_3Sn$ | |
|---|---|---|---|---|---|---|---|
| No. | Dc [μm] | Ds/Dc | Cu—Sn IMC [μm] | Sn Layer [μm] | Ni Layer [μm] | Coverage Factor [%] | Lb Ratio |
| B1 | 0.52 | 5.8 | 0.21 | 1.04 | 0.99 | 26 | 0.6 |
| B2 | 0.93 | 5.4 | 0.23 | 2.91 | 0.31 | 28 | 0.1 |
| B3 | 0.48 | 2.1 | 0.18 | 3.01 | 0.96 | 23 | 0.7 |
| B4 | 1.99 | 5.0 | 0.15 | 3.89 | 1.17 | 81 | 0.08 |
| B5 | 2.05 | 4.9 | 0.20 | 3.95 | 3.14 | 78 | 0.05 |
| B6 | 0.43 | 2.3 | 0.22 | 1.00 | 0.30 | 19 | 0.7 |
| B7 | 4.85 | 0.2 | 2.55 | 0.41 | 0.12 | 80 | 0.7 |
| B8 | 0.51 | 1.0 | 0.21 | 0.52 | 0.08 | 25 | 0.09 |

Regarding these Samples, contact resistance, residual Sn, and bending workability were evaluated. The contact resistance and residual Sn are evaluation results after a high-temperature maintaining test below. The bending workability is the evaluation result before the high-temperature maintaining test.

(Contact Resistance)

to High temperature was maintained in the air (the high-temperature maintaining test), and the contact resistance was measured. Maintaining conditions were 125° C. for 1000 hours for Samples having the Sn layer of thickness 1.2 μm or less; and 145° C. for 1000 hours for Samples thicker than 1.2 μm. The measurement method followed JIS-C-5402: load change-contact resistance was measured from zero to 50 g by a sliding method (1 mm) using a four-terminal contact resistance tester (CRS-113-AU: made by Yamasaki Seiki Institution); it was evaluated by the contact resistance value when the load was 50 g.

It was evaluated as "A" in which the contact resistance was 2 mΩ or low even after 1000 hours passed; "B" in which it exceeded 2 mΩ after 1000 hours passed but was 2 mΩ less at the time of 500 hours passed; and "C" in which it exceeded 2 mΩ at the time of 500 hours passed.

(Residual Sn)

The residual Sn was evaluated by the ratio of the film thickness of Sn remained without being alloyed after performing the high-temperature maintaining test to the film thickness of Sn which was not alloyed immediately after reflowing. That is to say, it shows that how much Sn which is not alloyed immediately after reflowing remained after the high-temperature maintaining test. Conditions of the high-temperature maintaining test were the same as in the case of the contact resistance. Ones exceeded 50% after 1000 hours past were evaluated "A"; ones more than 25% and 50% or less were "B"; and ones 25% or less were "C".

(Bending Workability)

Regarding the bending workability, Samples (rolled material) were cut out in a direction perpendicular to the rolling with a width 10 mm×a length 60 mm (60 mm in the rolling direction, 10 mm in the width direction); 180° bending test (a bending direction: Bad Way) was performed where a ratio of a bending radius R of a press hardware to a thickness "t" of Samples R/t=1, conforming the metal material bending test method regulated by JIS Z 2248; and it was observed whether or not cracks and the like were appeared on a surface and a cross section of the bended part by an optical microscope of 50 magnification. If the cracks and the like were not appeared and there was no large change such as cracks before and after the bending in the surface state, it was "OK"; and if the cracks were appeared, it was "NG". These results are shown in Tables 9 to 13.

TABLE 9

| No. | Contact Resistance | Residual Sn | Bending Workability |
|---|---|---|---|
| A1 | B | B | OK |
| A2 | B | B | OK |
| A3 | B | B | OK |
| A4 | A | A | OK |
| A5 | B | B | OK |
| A6 | A | A | OK |
| A7 | A | A | OK |
| A8 | A | A | OK |
| A9 | B | B | OK |
| A10 | A | A | OK |
| A11 | A | A | OK |
| A12 | B | B | OK |
| A13 | A | B | OK |

TABLE 10

| No. | Contact Resistance | Residual Sn | Bending Workability |
|---|---|---|---|
| A14 | A | A | OK |
| A15 | A | A | OK |
| A16 | A | A | OK |
| A17 | B | A | OK |
| A18 | A | B | OK |
| A19 | B | A | OK |
| A20 | B | A | OK |
| A21 | B | A | OK |
| A22 | A | A | OK |
| A23 | B | B | OK |
| A24 | A | A | OK |
| A25 | B | B | OK |
| A26 | A | A | OK |

TABLE 11

| No. | Contact Resistance | Residual Sn | Bending Workability |
|---|---|---|---|
| A27 | A | A | OK |
| A28 | B | B | OK |
| A29 | A | A | OK |
| A30 | A | A | OK |
| A31 | A | A | OK |
| A32 | A | A | OK |
| A33 | A | A | OK |
| A34 | A | A | OK |
| A35 | A | B | OK |
| A36 | B | A | OK |
| A37 | B | A | OK |
| A38 | B | A | OK |
| A39 | B | A | OK |

TABLE 12

| No. | Contact Resistance | Residual Sn | Bending Workability |
|---|---|---|---|
| A40 | A | A | OK |
| A41 | A | A | OK |
| A42 | B | A | OK |
| A43 | A | A | OK |
| A44 | A | A | OK |
| A45 | A | A | OK |
| A46 | A | A | OK |
| A47 | A | A | OK |
| A48 | A | A | OK |
| A49 | A | A | OK |
| A50 | A | A | OK |

TABLE 12-continued

| No. | Contact Resistance | Residual Sn | Bending Workability |
|---|---|---|---|
| A51 | A | B | OK |
| A52 | B | A | OK |

TABLE 13

| No. | Contact Resistance | Residual Sn | Bending Workability |
|---|---|---|---|
| B1 | C | C | OK |
| B2 | C | B | OK |
| B3 | C | C | OK |
| B4 | B | A | NG |
| B5 | A | A | NG |
| B6 | C | C | OK |
| B7 | C | C | OK |
| B8 | C | C | OK |

From these results, it was confirmed that the heat resistance (the contact resistance and the residual Sn) were B rank or more in Examples (Samples Al to A52) in which the thickness of the Ni layer was 0.1 μm or more and 1.0 μm or less, the thickness of the Cu—Sn intermetallic compound layer was 0.2 μm or more and 2.5 μm or less, the thickness of the Sn layer was 0.5 μm or more and 3.0 μm or less, the average crystal grain size Dc of the Cu—Sn intermetallic compound layer was 0.5 μm or more, and the grain size ratio Ds/Dc of the average crystal grain size Ds of the Sn layer to Dc was 5 or less. Moreover, deformation and cracks were not appeared in any Examples, and it was confirmed that they have good workability.

In contrast, in Comparative Examples (Samples B1 to B8), any of the grain size ratio Ds/Dc, the thickness of the Cu—Sn intermetallic compound layer, the thickness of the Ni layer and the like was out of the range of the present invention; as a result, the heat resistance was C rank or the bending workability was NG.

Figure 3:
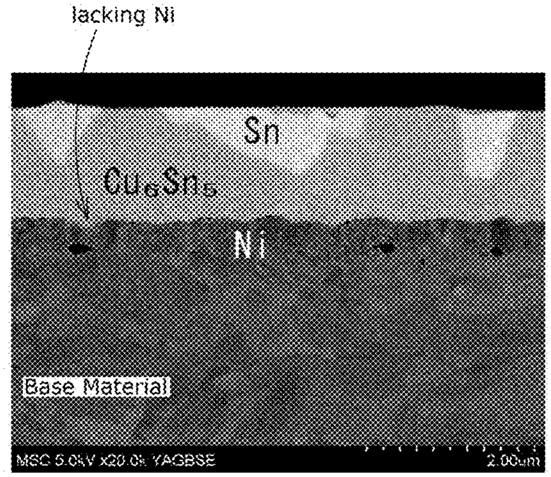
FIG. 3 It is an SEM image of a film cross section of Sample A27 after maintaining at 145° C.×240 hours.
Figure 4:
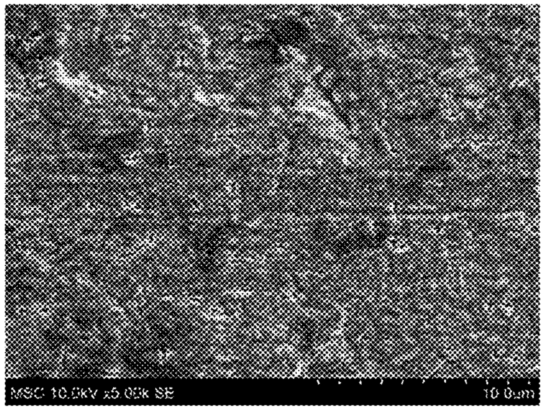
FIG. 4 It is a surface SEM image of the Ni layer of Sample A27 in which an Sn layer and a Cu—Sn intermetallic compound layer are peeled off, and observed after maintaining at 145° C.×240 hours.

FIG. 3 shows an SEM image of the cross section of the film of Sample A27 maintained at 145° C.×240 hours. FIG. 4 shows an observed surface SEM image of the Ni layer of Sample A27 maintained at 145° C.×240 hours and then the Sn layer and the Cu—Sn intermetallic compound layer were peeled off.

In the cross-section SEM image, the Cu—Sn intermetallic compound layer after maintaining the high temperature was composed of Cu6Sn5, and damages were confirmed in the Ni layer directly below a thin portion of the Cu—Sn intermetallic compound layer. From the surface SEM image of the Ni layer, it was confirmed that the damages of the Ni layer were webbed shape. As described above, even in Example (Sample A27) of the present invention, the damages of the Ni layer are proceeded and a part of the Ni layer disappears by maintaining high temperature for a long time, and the heat resistance is deteriorated since diffusion of Cu from the base material is proceeded, but the deterioration rate is slower than in Comparative Examples.

Figure 5:
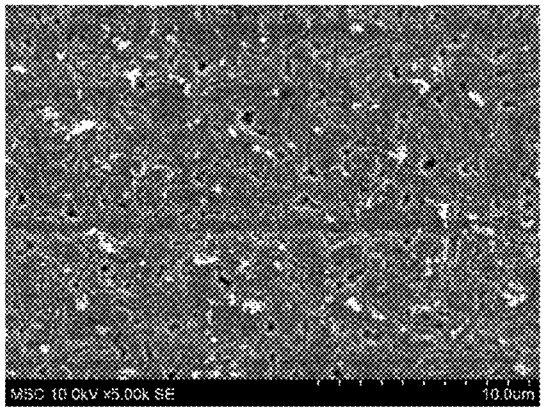
FIG. 5 It is an SEM image of a surface of the Ni layer of Sample B2 after maintaining at 145° C.×240 hours.
Figure 6:
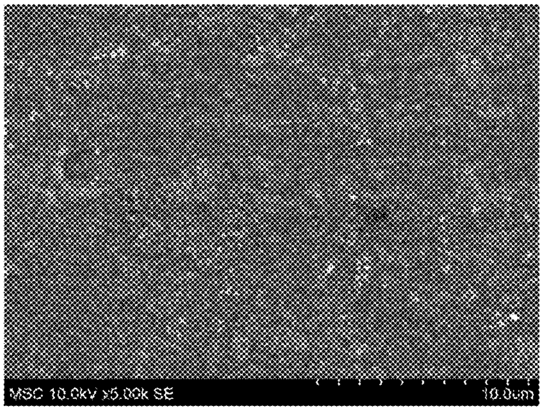
FIG. 6 It is an SEM image of a surface of the Ni layer of Sample A48 after maintaining at 145° C.×240 hours.

Surface SEM images of the Ni layer of Sample B2 (FIG. 5) and Sample A48 (FIG. 6) which were maintained at 145° C.×240 hours are shown. Comparing the Ni layer surface SEM images of FIGS. 4 to 6, the damage of the Ni layer is larger in B2 in which the coverage factor of the Cu3Sn layer is lower than A27. On the other, in A48 in which the coverage factor of the Cu3Sn layer is larger than A27, the damage of the Ni layer is smaller than that of A27. As described above, it is obvious that the damage of the Ni layer is lower in Samples in which the coverage factor of the Cu3Sn. A spot where the damage of the Ni layer easily occurs is a portion where the Cu—Sn intermetallic compound layer is thin, i.e., the vicinity of end portion of islet-shape crystal of Cu6Sn5. If the coverage factor of the Cu3Sn layer is higher, the islet-like crystal of the Cu6Sn5 layer is flatter, so that extremely thin portions are reduced and the damage of the Ni layer is reduced, as a result, the heat resistance can be expected to be improved.

INDUSTRIAL APPLICABILITY

To improve the heat resistance in a terminal material in which a Ni layer, a Cu—Sn intermetallic compound layer, and an Sn layer are formed in order.

REFERENCE SIGNS LIST

1 Terminal material for connector
2 Base material
3 Ni layer
4 Cu—Sn intermetallic compound layer
41 Cu3Sn layer
42 Cu6Sn5 layer
5 Sn layer

The invention claimed is:

1. A terminal material for a connector comprising:

a base material in which at least a surface is made of Cu or Cu alloy;

a Ni layer made of Ni or Ni alloy and formed on the base material;

a Cu—Sn intermetallic compound layer including Cu6Sn5 and formed on the Ni layer; and an Sn layer made of Sn or Sn alloy and formed on the Cu—Sn intermetallic compound layer, wherein a thickness of the Ni layer is 0.1 μm or more and 1.0 μm or less, a thickness of the Cu—Sn intermetallic compound layer is 0.2 μm or more and 2.5 μm or less, and a thickness of the Sn layer is 0.5 μm or more and 3.0 μm or less; and an average crystal grain size Dc is 0.5 μm or more, and a grain size ratio Ds/Dc is five or less where an average crystal grain size of the Cu6Sn5 in the Cu—Sn intermetallic compound layer is Dc and an average crystal grain size of the Sn layer is Ds, when cross sections of the Cu—Sn intermetallic compound layer and the Sn layer are analyzed by the EBSD method with a measuring step 0.1 μm and a boundary in which misorientation between adjacent pixels is 2° or more is deemed to be a crystal boundary.

2. The terminal material for a connector according to claim 1, wherein the Cu—Sn intermetallic compound layer is composed of a Cu3Sn layer formed on the Ni layer and the Cu6Sn5 layer formed on the Cu3Sn layer, and a coverage factor of the Cu3Sn layer to the Ni layer is 20% or more.

3. The terminal material for a connector according to claim 2, wherein the Sn layer is made of solidification structure.

4. The terminal material according to claim 2, wherein in the Sn layer, when a grain boundary length of a crystal in which the misorientation is 15° or more is La and a grain boundary length of a crystal in which the misorientation is 2° or more and less than 15° is Lb among the crystal boundary demarcated by the EBSD method, an Lb ratio (Lb/(Lb+La)) is 0.1 or more.

5. The terminal material for a connector according to claim 1, wherein the Sn layer is made of solidification structure.

6. The terminal material according to claim 5, wherein in the Sn layer, when a grain boundary length of a crystal in which the misorientation is 15° or more is La and a grain boundary length of a crystal in which the misorientation is 2° or more and less than 15° is Lb among the crystal boundary demarcated by the EBSD method, an Lb ratio (Lb/(Lb+La)) is 0.1 or more.

7. The terminal material according to claim 1, wherein in the Sn layer, when a grain boundary length of a crystal in which the misorientation is 15° or more is La and a grain boundary length of a crystal in which the misorientation is 2° or more and less than 15° is Lb among the crystal boundary demarcated by the EBSD method, an Lb ratio (Lb/(Lb+La)) is 0.1 or more.

8. A manufacturing method of a terminal material for a connector according to claim 1 comprising:

a plating treatment step performing an Ni plating treatment forming a plating layer made of Ni or Ni alloy on a surface of a base material in which at least a surface is made of Cu or Cu alloy, a Cu plating treatment forming a plating layer made of Cu or Cu alloy, and an Sn plating treatment forming a plating layer made of Sn or Sn alloy in this order; and a reflowing treatment step performing a reflow treatment after the plating treatment step, wherein an Ni layer made of Ni or Ni alloy is formed on the base material, a Cu—Sn intermetallic compound layer made of intermetallic compound of Cu and Sn is formed on the Ni layer, and an Sn layer made of Sn or Sn alloy is formed on the Cu—Sn intermetallic compound layer, wherein the reflowing treatment has a heating step performing a primary heating treatment heating to 240° C. or more at a raising temperature rate of 20° C./second or more and 75° C./second or less and a secondary heating treatment heating after the primary heating treatment at temperature of 240° C. or more and 300° C. or less for time of one second or more and 15 seconds or less;

a primary cooling step cooling after the heating step at a cooling rate of 30° C./second or less; and a secondary cooling step after the primary cooling at a cooling rate of 100° C./second or more and 300° C./second or less.

* * * * *